United States Patent
Gallo et al.

(10) Patent No.: US 9,483,470 B2
(45) Date of Patent: Nov. 1, 2016

(54) DOCUMENT NAVIGATION METHOD

(75) Inventors: Robert Gallo, Tucker, GA (US); Glen Gordon, Fitchburg, WI (US)

(73) Assignee: Freedom Scientific, Inc., St. Petersburg, FL (US)

(*) Notice: Subject to any disclaimer, the term of this patent is extended or adjusted under 35 U.S.C. 154(b) by 1207 days.

(21) Appl. No.: 13/470,952

(22) Filed: May 14, 2012

(65) Prior Publication Data

US 2012/0226501 A1 Sep. 6, 2012

Related U.S. Application Data

(62) Division of application No. 12/759,991, filed on Apr. 14, 2010, now Pat. No. 8,209,607.

(60) Provisional application No. 61/169,129, filed on Apr. 14, 2009.

(51) Int. Cl.
  *G06F 17/30* (2006.01)
  *G06F 3/0484* (2013.01)
  *G06F 11/34* (2006.01)

(52) U.S. Cl.
  CPC ....... *G06F 17/30011* (2013.01); *G06F 3/0484* (2013.01); *G06F 11/3438* (2013.01); *G06F 17/30867* (2013.01)

(58) Field of Classification Search
  CPC ............. G06F 3/0484; G06F 11/3438; G06F 17/30867
  See application file for complete search history.

(56) References Cited

U.S. PATENT DOCUMENTS

| | | |
|---|---|---|
| 5,721,897 A | 2/1998 | Rubinstein |
| 5,850,629 A | 12/1998 | Holm et al. |
| 6,055,542 A * | 4/2000 | Nielsen ............ G06F 17/30867 |
| 6,437,758 B1* | 8/2002 | Nielsen .................. G06F 3/013 345/7 |
| 6,993,707 B2 | 1/2006 | Baker et al. |
| 2003/0101024 A1 | 5/2003 | Adar et al. |
| 2005/0210030 A1* | 9/2005 | Gordon .............. G06F 17/2247 |
| 2006/0080310 A1* | 4/2006 | Gordon ............ G06F 17/30719 |
| 2007/0277121 A1 | 11/2007 | Beckman |
| 2008/0027924 A1* | 1/2008 | Hamilton .......... G06F 17/30867 |
| 2008/0201242 A1* | 8/2008 | Minnis ............. G06F 17/30867 705/14.53 |
| 2009/0210806 A1 | 8/2009 | Dodson et al. |
| 2010/0095219 A1 | 4/2010 | Stachowiak et al. |
| 2010/0274815 A1 | 10/2010 | Vanasco |

OTHER PUBLICATIONS

A. Georgakis et al. 'User behavior modeling and content based speculative web page prefetching.' In: Data & Knowledge Engineering, Selection of papers presented at the 22nd Int'l Conference on Conceptual Modeling, 22nd Int'l Conference on Conceptual Modeling, elsevier, vol. 59, Issue 3, 2006, pp. 770-778.

* cited by examiner

*Primary Examiner* — Tuyetlien T Tran
(74) *Attorney, Agent, or Firm* — Andriy Lytvyn; Anton J. Hopen; Smith & Hopen, P.A.

(57) ABSTRACT

A document navigation tool that automatically navigates a document based on previous input from the user. The document navigation tool is utilized each time a page loads. The method recognizes user behavior on pages using patterns, which are based on four criterion: location, frequency, consistency, and scope. If the user has visited the page previously and has established a pattern, the method automatically focuses on the portion of the page indicated by the pattern, e.g. the location on a web page of the link clicked by the user in the user's last three visits to the page. If the user has not visited the page previously, the method logs the events that occur during this visit to the page.

5 Claims, 6 Drawing Sheets

(56) References Cited

U.S. PATENT DOCUMENTS

DOCUMENT NAVIGATION METHOD

CROSS REFERENCE TO RELATED APPLICATIONS

This application is a divisional application of U.S. Non-Provisional patent application Ser. No. 12/759,991 entitled, "Document Navigation Method" and filed Apr. 14, 2010 which further claims priority to U.S. Provisional Patent Application No. 61/169,129 filed Apr. 14, 2009.

FIELD OF INVENTION

This invention relates to screen reader applications for computer systems. More specifically, this invention assists the screen reader user in navigating a document using previous user actions.

BACKGROUND

Personal computers and the Internet greatly enhanced communications and access to information from around the world. Typically, visual information is displayed on a monitor screen and data can be added or manipulated via keystrokes on an associated keyboard. Feedback is provided visually to the user by the monitor screen. Blind users cannot utilize the information appearing on the monitor screen while visually impaired users may experience difficulty doing so. Accordingly, screen readers have been developed to assist blind and visually impaired users when they use a personal computer.

A screen reader is software that interprets the output of a computer as sent to a computer screen and converts it into alternative output. Typically, the alternative output is in the form of synthetic speech or Braille characters. Screen readers are particularly useful for a blind or low-vision user. One such screen reader is JAWS® by FREEDOM SCIENTIFIC®. When installed on a personal computer, JAWS® provides access to the operating system, software applications, and the Internet. JAWS® includes a speech synthesizer that cooperates with the sound card in the personal computer to read aloud information appearing on the computer monitor screen or that is derived through communicating directly with the application or operating system. Additionally, JAWS® includes an interface that can provide output to refreshable Braille displays. Thus, JAWS® provides access to a wide variety of information, education, and job related applications.

Available screen readers have a limited ability to navigate the Internet. No matter how many times a user has visited a certain web page and performed a number of actions to navigate to a certain portion of the web page, the user must repeat a number of actions to arrive at that portion of the web page each time the user visits the web page. A typical sighted user, or "typical user", can make a cursory scan of the window of data until he or she arrives at the desired information. In performing that scan, a great amount of data can be passed over quickly until the desired information is found. That desired information is then considered in greater detail while the scanned information is otherwise ignored and forgotten. For the typical user such a process is a trivial task. For a vision-impaired or blind user it is not nearly as simple. The blind or vision-impaired user will frequently utilize a screen reader to access the information that would otherwise be displayed on the screen. To output the information, the screen reader must serially pass the information to the display device. By "display" it is meant that the information is presented to the user in a manner in which the information can be meaningfully assessed by the user. Display is not limited to visual presentations of data, but may include other means of presenting such as auditory output and Braille devices. The user experiences the associated information in the order provided by the underlying application. A great amount of time can be spent waiting to arrive at the information sought by the user.

This process becomes even more inconvenient when the user accesses a certain web page repeatedly. For example, a user may access their banking institution's web page each month to pay a cell phone bill with the aid of a screen reader, such as JAWS®. In order to do this, the user opens the browser, opens the list of bookmarked web pages, and selects their banking institution. When the page loads, the user opens the JAWS® list of links, locates the sign-in link by typing "S I G," and presses 'Enter' to activate it. The sign-in page loads. Now, the user presses the 'Ctrl' key to stop JAWS® from reading the page automatically, and presses the JAWS® quick navigation key 'E' twice to move to the second edit field on the page to enter the user name. After filling out the form, a page with several course navigation options is presented to the user, each leading to pages with finer and finer options. Example pages are: "payments", "make a one-time payment", "select a payee", and "enter your payment information". For each of these pages, the user locates the link she wants by using the JAWS® list of links, searching for the link text on the page, reading through the page until she arrives at the link, or using various combinations of quick navigation keys to hunt for the link. The user must go through all these steps each time the user pays the cell phone bill. What is needed is a means of shortening the navigation time of a web page by focusing the screen reader on areas the user has previously shown interest in.

SUMMARY

The present invention is a document navigation tool that may automatically navigate a web page or other document, such as a Portable Document Format (PDF) document or a flash presentation, based on previous input from the user. The document navigation tool, one embodiment of which is referred to as PATHFINDER™, may be called by a screen reader, such as JAWS®, each time a document loads. If the user has visited the document previously, the document navigation tool may automatically focus on the portion of the document the user selected or acted upon in a prior visit to the page of the document. If the user has not visited the document previously, the document navigation tool may log the events that occur during the user's visit to the page.

In some embodiments, the document navigation tool can be used apart from a screen reader, such as by being implemented by a web browser or browser plug-in. The document navigation tool can then be used by a sighted user to track the links, buttons, or form fields selected by a user. As the user navigates the pages of the documents (e.g. web pages) repeatedly, the document navigation tool can automatically scroll to those links, buttons, and/or form fields the user visited previously.

In one embodiment, the document navigation tool begins by determining if a saved path has been set on the page. The saved path indicates an area of interest on the page. If a saved path is present on the page, the area of interest indicated by the saved path is focused on. A memorable event, input by the user, is received and saved to a log of memorable events. A memorable event may be clicking a link, clicking a button, entering data in an editable field, or performing a 'say all' command. If the memorable event occurred in the area of interest, the saved path is maintained. However, if the memorable event occurred outside the area of interest or if no saved path is present on the page, it is determined if a new path has been established using the memorable event and the memorable event(s) in the memorable event log. If it is determined that a new path has been established, then a new path is set in the area corresponding to the memorable event. The determination of whether a new path has been established may be determined using one or more of location, consistency, frequency, and scope.

The document navigation tool may also determine whether a saved path should be abandoned. In one embodiment, this is determined using consistency. For example, the consistency of the memorable event may be determined and then compared to a predetermined criterion. If the consistency is less than the predetermined criterion, then the path is not abandoned. If the consistency is greater than the predetermined criterion and the location of the memorable event does not match the saved path, then the path is abandoned; however, if the consistency is greater than the predetermined criterion but the location of the memorable event matches the saved path, then the path may not be abandoned.

In another embodiment, the document navigation tool automatically fills in editable fields and/or makes selections (or follows paths) for the user as it focuses on the areas. The document navigation tool begins by determining if a saved path has been set on the page. The saved path indicates an area of interest on the page. If a saved path is present on the page, the area of interest indicated by the saved path is focused on. An action is then performed according to the saved path.

In some embodiments, the document navigation tool may include a method of monitoring how a user reads a page with a screen reader and removes portions of the page the user skips over repeatedly. In this manner, the number of steps a user must undergo to read a portion of a page that is filled with unneeded text, links, and/or graphics, is substantially reduced. One method of suppressing repeatedly skipped content is to utilize common string handling techniques which are known by those of ordinary skill in the art. For example, if a web page document including several new sections including a "sports section" which is always displayed between a "health section" and a "science section" then an HTML string pattern for the start of the "sports section" would define the beginning of the to-be-redacted string and the HTML string pattern for the start of the "science section" would define the end of the "sports section." By using these two string patterns the "sports section" can be identified and redacted at runtime.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In one embodiment, the present invention is directed to a document navigation tool that automatically navigates a webpage, or other document, such as a Portable Document Format (PDF) document or a flash presentation, based on previous input from the user. The document navigation tool of this embodiment, one version of which is referred to as PATHFINDER™, is called by a screen reader, such as JAWS®, each time a document loads. If the user has visited the document previously, the document navigation tool automatically focuses on the portion of the document the user selected or acted upon in a prior visit to the page of the document. If the user has not visited the document previously, the document navigation tool logs the events that occur during the user's visit to the page.

In the banking institution example described in the background section, after the user arrives at the banking institution website, as the first page loads, the document navigation tool of this embodiment would automatically set the focus on the "sign in" link. When the user selects the "sign in", the document navigation tool sets the focus on the "user name" edit field as the next page loads. On the following page, the document navigation tool sets the focus on the "payments" link, then focuses on the "make a one-time payment" link on the next page. The document navigation tool then sets the focus on the "cell phone company" link on the subsequent page, and then on the "amount" edit field.

The document navigation tool of this embodiment uses place markers for rapid navigation. A place marker is a saved location on a document. Presently, in screen reader applications, such as JAWS®, a user creates a place marker for a document, and then uses quick navigation keys to move to that location from anywhere on the page. Place markers for HTML-based documents are presented in U.S. Pat. No. 6,993,707, which is herein incorporated by reference. The document navigation tool relies on place markers to indicate the location where a memorable event has occurred.

For the purposes of this document, "path" refers to a place marker at the location the user likely wishes to go on a page of a document. For example, if a user repeatedly chooses the same link on a web page, the path becomes a place marker set at that link.

Once the path for a document has been established, the document navigation tool will set focus to the path's place marker when the page of the document loads.

Figure 1A:
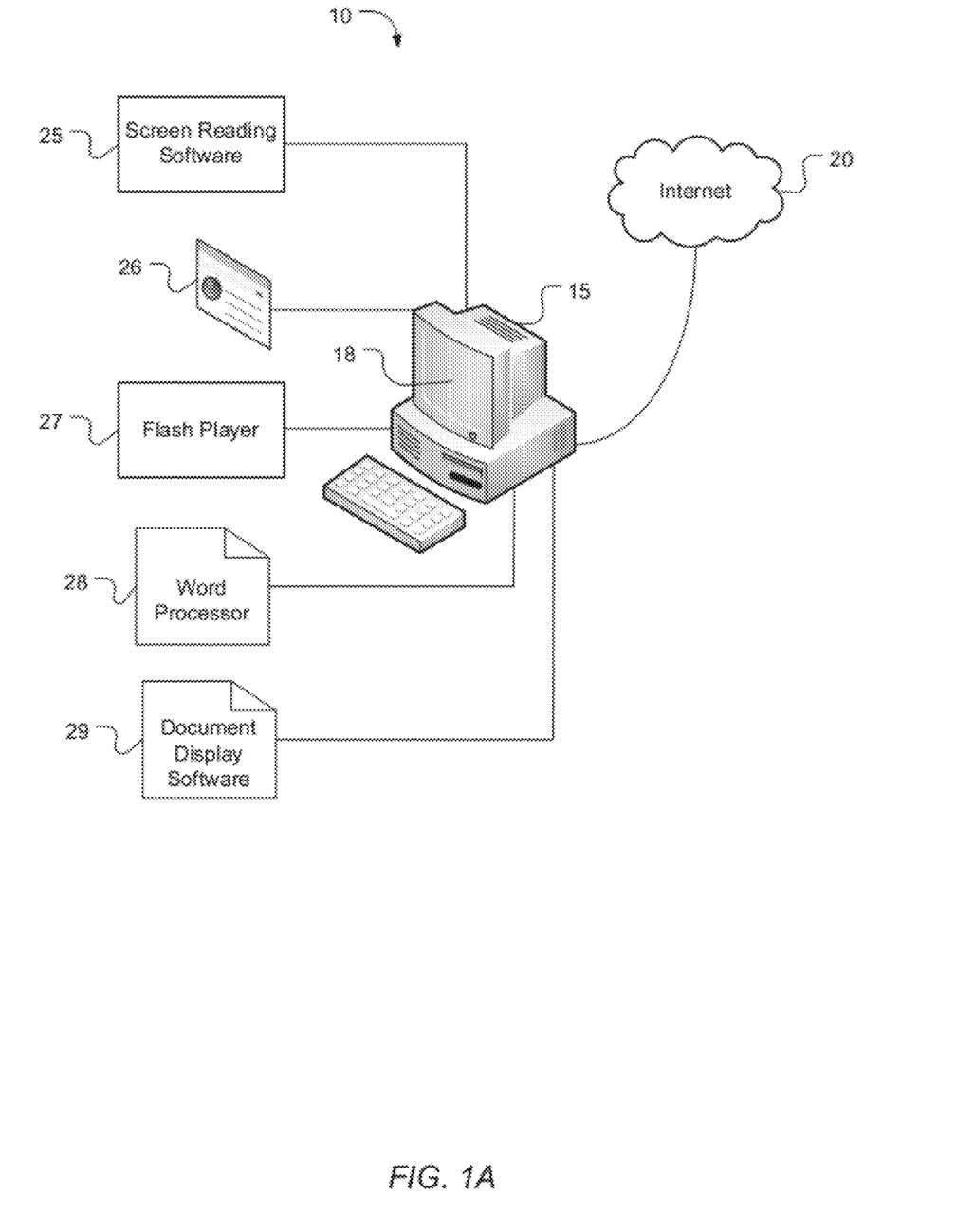
FIG. 1A is a schematic diagram illustrating the an embodiment of the present invention as applied to a personal computer.

Referring now to the drawings, there is shown in FIG. 1A, computer installation 10 with computer 15 having display 18 and a tangible non-transitory computer readable storage medium that includes software instructions capable of causing computer 15 to carry out the operations of the document navigation tool. Computer 15 may also be connected by conventional access hardware to the Internet 20. Computer 15 may optionally be equipped with one or more of screen reading software 25, web browser 26, flash player 27, word processor 28 and any other software program that displays a document 29. Through execution of the software instructions, computer 15 navigates a document displayed on display 18.

Figure 1B:
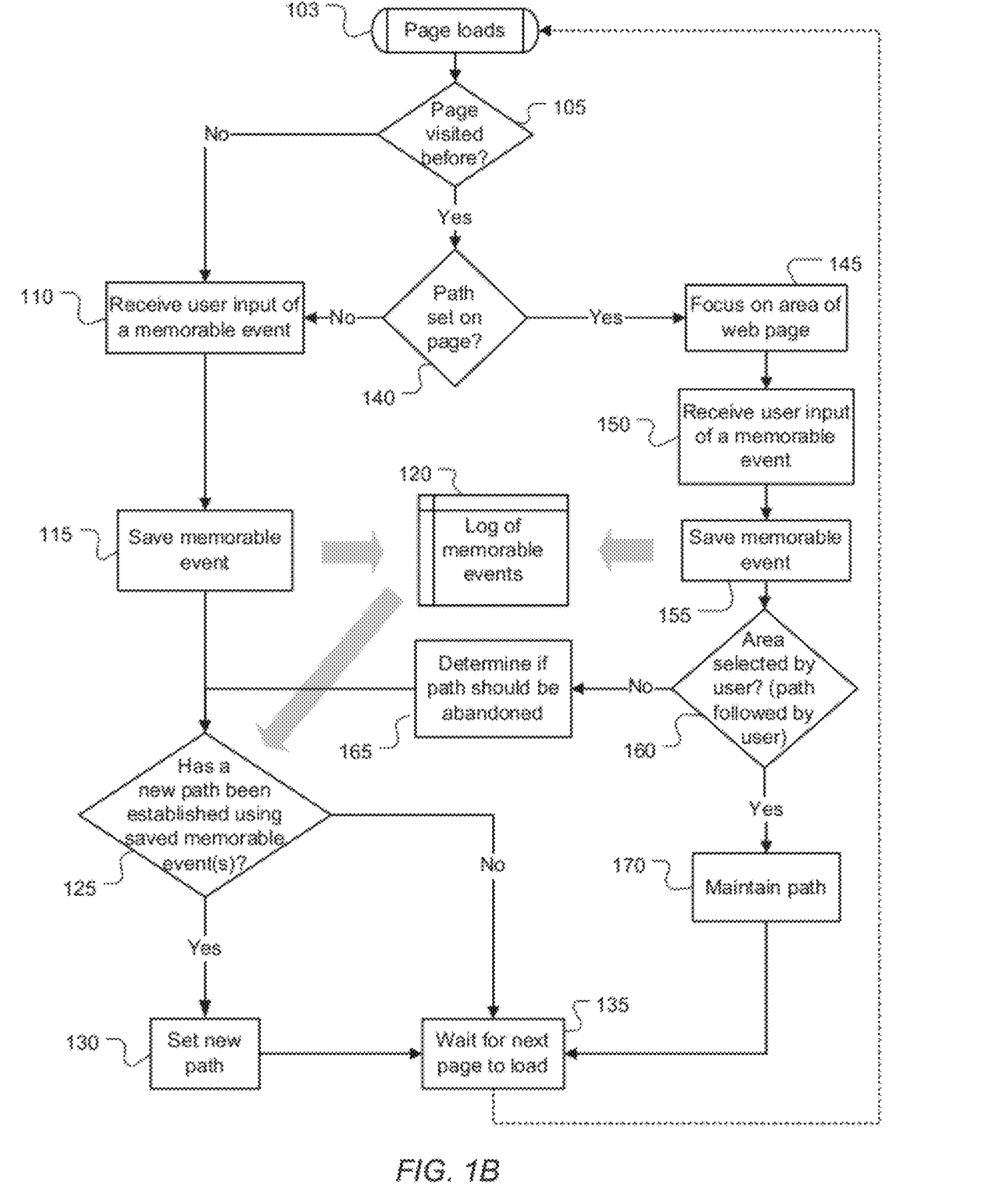
FIG. 1B is a flowchart of the document navigation method in accordance with an embodiment of the present invention.

The flowchart of FIG. 1B shows an embodiment of the present invention. Each time a page loads (operation 103), the document navigation tool determines if the page has been visited previously (operation 105). If it is the first time the page has been visited by the user, the document navigation tool waits for a memorable event to occur.

The document navigation tool learns a user's navigation habits by recording and recalling memorable events. Memorable events indicate that the user has found content on a page that he or she wishes to read or interact with. Memorable events are actions initiated by the user that trigger the document navigation tool to remember the current location. The trigger event is the first memorable event that occurs after a page loads. The following is a non-exhaustive list of exemplar memorable events: clicking a link, clicking a button, entering data in an editable field, performing a 'say all' command. A 'say all' command instructs a screen reader to read from the point where a user initiate the command to the end of the document or until the user instructs the screen reader to stop.

Once a memorable event is received (operation 110), it is saved to memorable event log 120 (operation 115). It is then determined if a new path has been established using the memorable event and the memorable event(s) saved in memorable event log 120 (operation 125). If it is determined that a new path has been established, then a new path is set in the area corresponding to the memorable event (operation 130) and the document navigation tool then waits for the next page to load (operation 135). If it is determined that a new path has not been established, then a new path is not set and the document navigation tool just waits for the next page to load (operation 135).

If the page has been visited before, then the document navigation tool determines if a path is already set on the page (operation 140). If a path has not been set on the page, the document navigation tool waits for a memorable event to be input by the user, and the operations to log the memorable event (operation 115) and determine if a pattern has been established (operation 125), as discussed previously, are then followed. If a path has been set on the page, then focus is set on the area where the path (or the place marker that begins the path) is set (operation 145). The document navigation tool then waits for a memorable event to occur. Once a memorable event occurs (operation 150), the memorable event is saved to memorable event log 120 (operation 155) and then it is determined if the memorable event occurs in the focus area (i.e. whether the user followed the path) (operation 160). If the memorable event occurs in the focus area, the path is maintained (operation 170) and the document navigation tool waits for the next page to load (operation 135). If the memorable event does not occur in the focus area, it is determined if the path should be abandoned (operation 165) and then it is determined if a new path has been established using the memorable event and the memorable event(s) from memorable events log 120 (operation 125).

In certain embodiments, the document navigation tool recognizes user behavior in documents through the use of patterns. A pattern is a repeated action taken by a user on a page or site. Patterns determine where the path is set. The document navigation tool will recognize patterns based on four criterion: (1) location, (2) frequency, (3) consistency, and (4) scope. Patterns emerge when predetermined requirements for these criterion are met.

(1) Location is where a place marker may be set to mark the path. Two locations begin to form a pattern if their place markers are the same.

Example Requirement: To create a pattern, location place markers must be identical.

(2) Frequency indicates the repeated occurrence of a memorable event at one location on a page. Frequency is represented as a ratio of events at a particular location to events on a page or site as a whole. It can be thought of as a percentage of specific actions to all actions. For example, if a user visits the same page four times, and activates the same link on that page three times, she has chosen the same link 75% of the time, or a frequency of 3:4. Frequency indicates a pattern when the ratio of one action to all actions is high.

Furthermore, only the most recent events are taken into account for frequency calculations. Therefore, while a user may have visited a page ten times, if the predetermined criterion for frequency is 4:5, the document navigation tool would use only the latest five visits to determine the frequency of a particular event. Lastly, measurement of frequency continues even after the path has been established. Having the frequency continually calculated with recent data, even after a path has been established, allows new patterns to emerge, or old paths to be abandoned.

Example requirement: To create a pattern, an event must occur at the same location X out of the last Y visits to a web page. Note that the numerator and denominator of frequency refer to a number of locations, not matches of locations.

(3) Consistency is the number of consecutive event occurrences at the last location. In other words, it is how many times in a row the most recent action has been taken. If the current location matches the last location where a memorable event occurred, the consistency is incremented by 1. If the current and last locations do not match, the consistency is reset to 1.

Example requirement: To create a pattern, events must occur at the same location N times in a row. Note that, logically, the consistency will never be larger than the numerator of the frequency.

In some embodiments, meeting the requirements of either frequency or consistency is sufficient to establish a pattern. The distinction between these two criterion is discussed further below.

(4) Scope is the specificity of a URL. The frequency for patterns matched at page scope may be smaller than the frequency for patterns matched at document scope. In other words, a pattern for a single page may emerge quickly. However, if a pattern emerges over time amongst several pages of the same document, the path for all pages in the document will be the same, even for pages which the screen reader has not yet encountered.

Example requirement: To create a pattern at page scope, an event must occur at the same location three out of the last four visits to a web page. To create a pattern at site scope, an event must occur at the same location seven out of the last eight visits to pages on that site.

The process of setting the path in the exemplar embodiment begins when a page loads, and a memorable event occurs which triggers the document navigation tool to save the location of the event as a place marker. If the steps above recur, with the location being the same each time, a pattern emerges and the document navigation tool can evaluate these matches as a potential path.

In this embodiment, the criterion for setting the path can be broken down into three numbers: the consistency, the frequency numerator, and the frequency denominator. Each one of these numbers refers to the matches, or possible matches, of two locations on a page. Consistency and frequency are separate but equal bases for setting the path; the consistency is one criterion, and the frequency is another. The path is set when either one of these criterion is met.

The following is an example set of the numbers described above, and how these numbers are used. With a consistency of three, and a frequency of 3:4, if a user visits the same web page three times, and activates the same link all three times, the consistency criterion is met. If the user visits the same web page four times, and activates a particular link three out of the four times, the frequency criterion is met. In either case, the path would be set for the link, which was repeatedly activated.

Once the path is set, on the next visit to the page, the document navigation tool positions the user at the path location, rather than performing the normal behavior of a screen reader, which is reading the page from the top down.

Because the frequency size is finite, in this case four, the user can visit the page many times and have the path set or reset depending on the current pattern of use. For example, if the user visits the page eight times, and on the first five visits, she chooses various links on the page, but in the next three visits, she activates the same link three times in a row, the path will be set to the last link she selected.

Figure 2A:
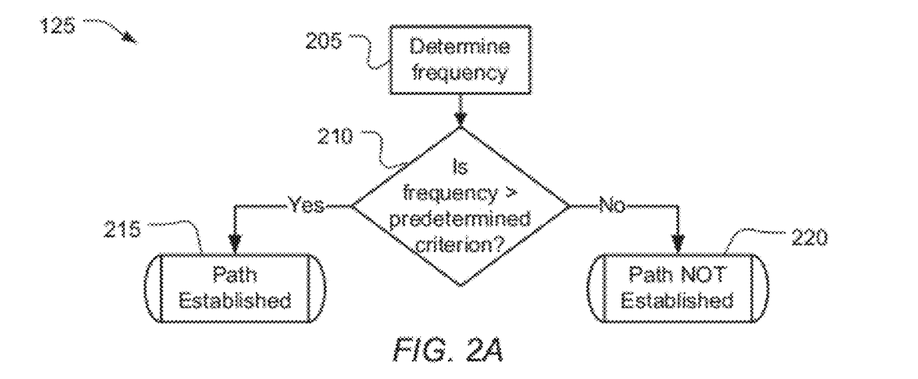
FIG. 2A is a flowchart of a feature of the document navigation method in which frequency is used to determine if a new path has been established according to an embodiment of the present invention.
Figure 2B:
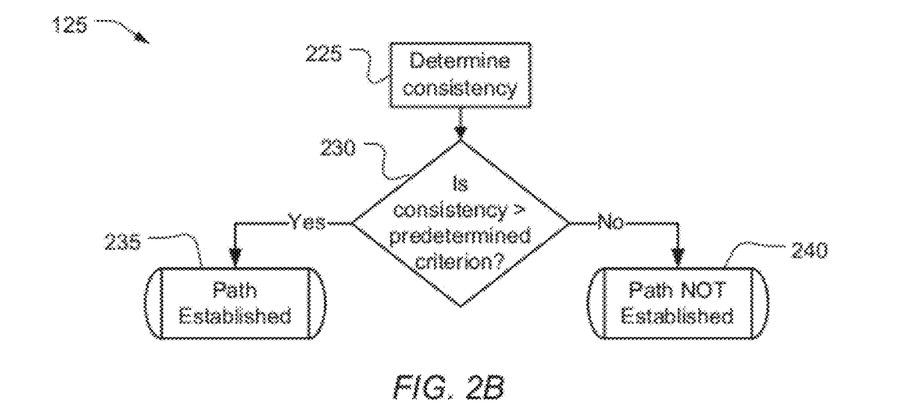
FIG. 2B is a flowchart of a feature of the document navigation method in which consistency is used to determine if a new path has been established according to an embodiment of the present invention.
Figure 2C:
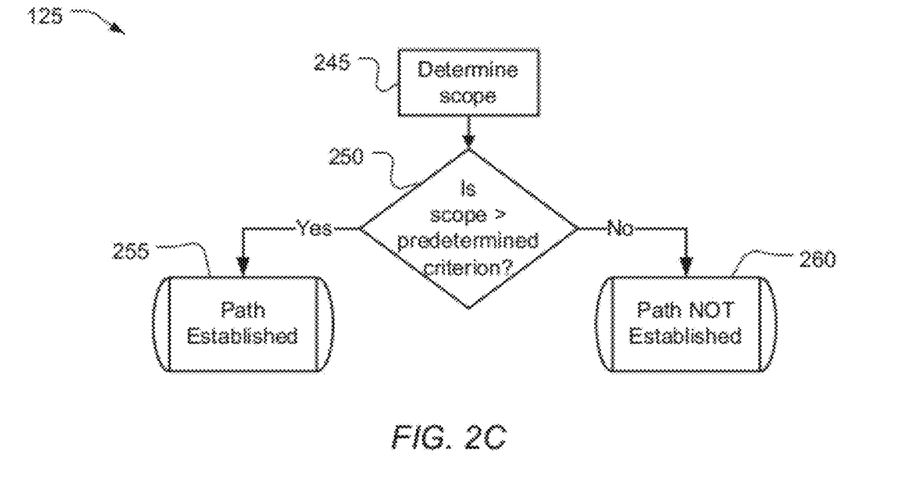
FIG. 2C is a flowchart of a feature of the document navigation method in which scope is used to determine if a new path has been established according to an embodiment of the present invention.

FIGS. 2A through 2C show example uses of frequency (FIG. 2A), consistency (FIG. 2B), and scope (FIG. 2C) in determining if a new path has been established (FIG. 1B, operation 125). As shown in FIGS. 2A-2C, the document navigation tool determines the frequency (operation 205), consistency (operation 225), or scope (operation 245). It is then determined if the frequency is greater than a predetermined criterion (operation 210), if the consistency is greater than a predetermined criterion (operation 230), and if the scope is greater than a predetermined criterion (operation 250), respectively. If the frequency (operation 205), consistency (operation 225), or scope (operation 245) is greater than the respective predetermined criterion, then the path is established (operations 215, 235, and 255, respectively); otherwise, the path is not established (operations 220, 240, and 260, respectively).

Figure 2D:
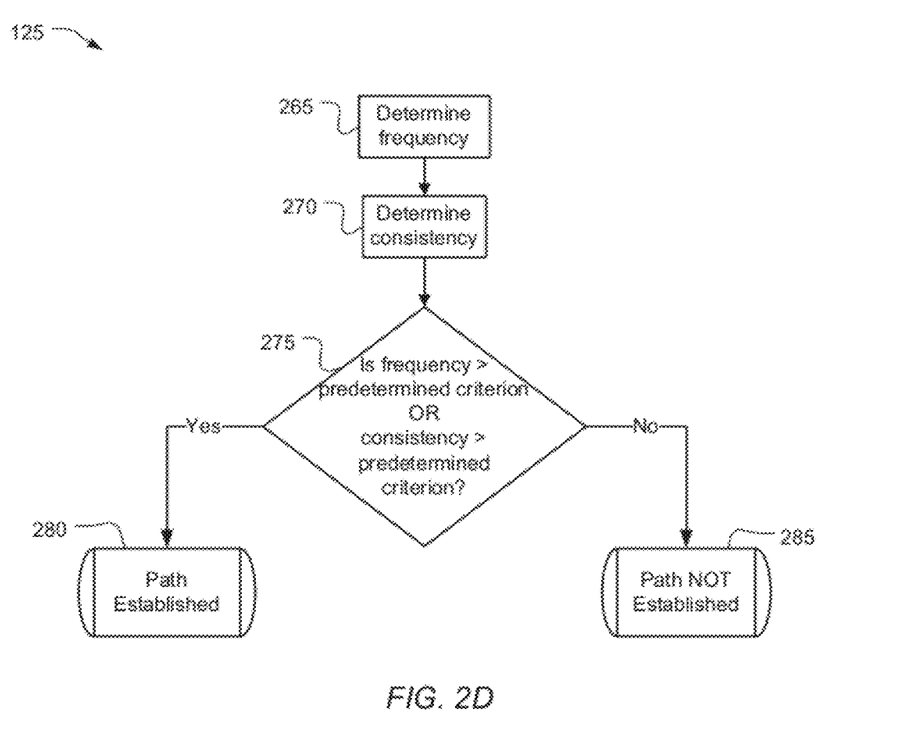
FIG. 2D is a flowchart of a feature of the document navigation method in which frequency and consistency are used to determine if a new path has been established according to an embodiment of the present invention.

As discussed previously, in this embodiment only one of the determinations of frequency, consistency, and/or scope is required, but a combination of one or more of the determinations is also contemplated by the present invention. In the example in FIG. 2D, both frequency and consistency are used to determine if a new path has been established (FIG. 1B, operation 125). As shown in the flowchart, frequency (operation 265) and consistency (operation 270) are determined. Then, if either the frequency is above a pre-determined criterion or the consistency is above a pre-determined criterion (operation 275), a path is established (operation 280); otherwise, a path is not established (operation 285).

Location, frequency, and consistency data will be kept for both individual document pages (e.g. a single web page) and entire documents (e.g. an entire web site). A web page is a single page of web content; for example http://www.freedomscientific.com/products/fs/JAWS-product-page.asp. A website is a series of related web pages; for example www.freedomscientific.com and all of the links that fall under this URL. This allows the document navigation tool to quickly set paths for specific pages, and if, over time, a pattern should emerge for an entire web site, the document navigation tool can set a path for the whole website as well. The requirements for setting paths for a website are generally stricter, and generally require more visits, than requirements for a single web page.

If a user continues to take actions on a page where a path has been set, but the actions taken do not follow the path, the path will be abandoned. The metric for when to abandon a path is the consistency. For example, if a number of events occurs equal to the number of events in the consistency, and none of the locations associated with those events match the path, the path will be abandoned. Therefore, if a path has been set and the consistency is three, if three new events occur, none of which matches the stored path, the path will be abandoned. Note that in this example, if the locations of the three new events do not match the path, but do match each other, the path will be reset to the new location.

Figure 3:
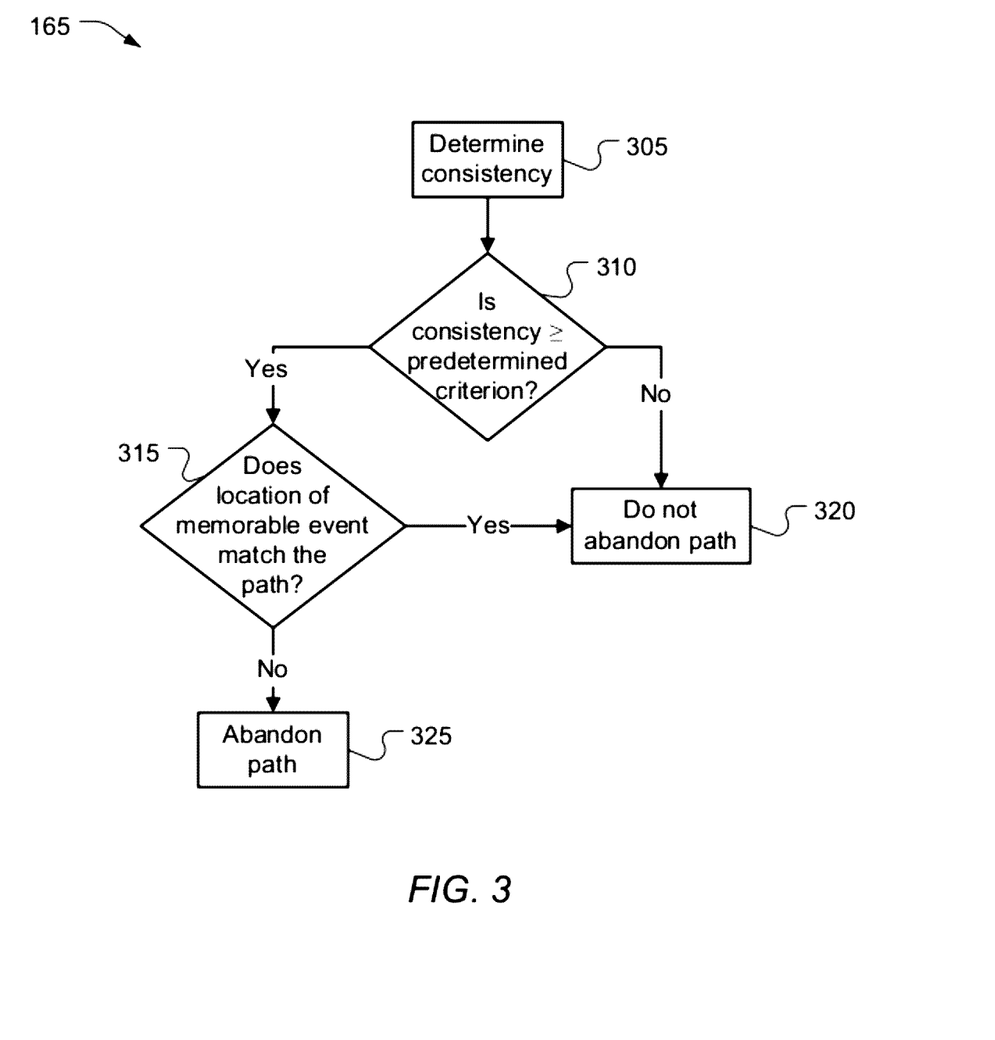
FIG. 3 is a flowchart of a feature of the document navigation method in which consistency is used to determine if a path should be abandoned according to an embodiment of the present invention.

An example of the method used to determine if a path should be abandoned (FIG. 1B, operation 165) is shown in FIG. 3. Once the consistency is determined (operation 305), it is compared to a predetermined criterion (operation 310). If the consistency is less than the predetermined criterion, then the path is not abandoned (operation 320). If the consistency is greater than or equal to the predetermined criterion, then it is determined if the location of the memorable event matches the path (operation 315). If so, then the path is not abandoned (operation 320). If the location of the memorable event does not match the path, then the path is abandoned (operation 325).

The document navigation tool can also be used apart from a screen reader. The document navigation tool can be implemented by a browser or browser plug-in. The document navigation tool can then be used by a sighted user to track the links, buttons, or form field selected by a user. As the user navigates the document repeatedly, the document navigation tool will automatically scroll to those links, buttons, and/or form fields the user visited previously. In this manner, the document navigation tool will set the focus to the appropriate area and may place the cursor in the edit field where it is most likely the user will want to type or it may move the mouse pointer over a link that the user is most likely to click, based on past behavior.

In an embodiment, the document navigation tool is set to automatically fill in editable fields and make selections for the user as it focuses on the areas. This allows navigation through a number of pages without the user having to give any input. Continuing with the banking example, the user would only need to navigate to the banking institution's website and the document navigation tool will automatically select "sign in" and enter the user's user name. The document navigation tool will then wait for the next page to load, select the "payments" link, wait for the payments page to load, and select the "make a one-time payment" link, wait for the one-time payment page to load, and select the "cell phone company" link. After the cell phone company's one-time payment page loads, the document navigation tool sets the focus on the "amount" field and waits for the user to enter the payment amount. In this manner, the user only needs to navigate to the banking institutions website and the document navigation tool does all of the work to navigate the user to the area where the user can enter the amount of the payment.

Figure 4:
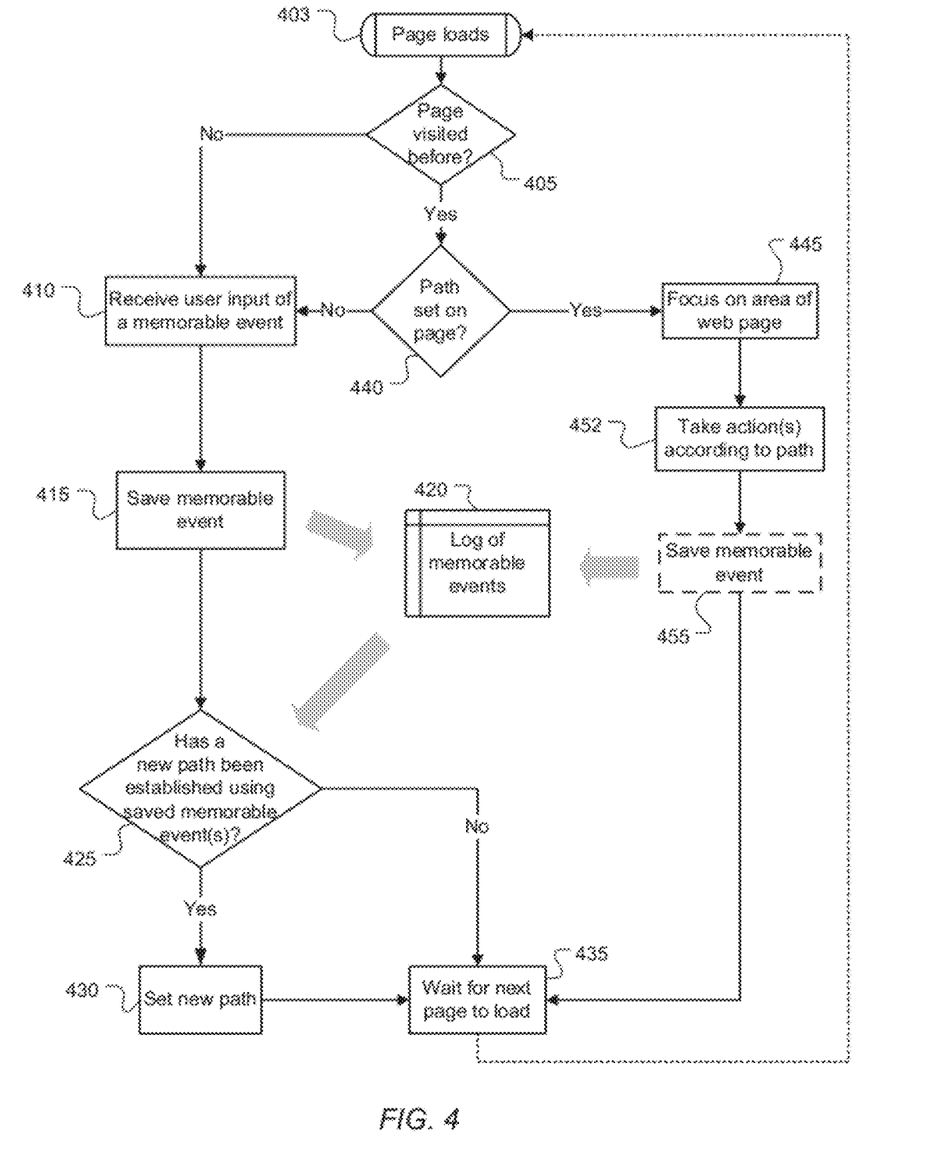
FIG. 4 is a flowchart of the document navigation method in which paths are automatically followed as areas are focused on in accordance with an embodiment of the present invention.

An example of this embodiment is shown in the flowchart of FIG. 4. Each time a page loads (operation 403), the document navigation tool determines if the page has been visited previously (operation 405). If it is the first time the page has been visited by the user, the document navigation tool waits for a memorable event to occur. Once a memorable event is received (operation 410), it is saved to memorable event log 420 (operation 415). It is then determined if a new path has been established using the memorable event and the memorable event(s) saved in memorable event log 420 (operation 425). The determination of whether a new path has been established may include those methods described above (and in FIGS. 2A through 2D). If it is determined that a new path has been established, then a new path is set in the area corresponding to the memorable event (operation 430) and the document navigation tool then waits for the next page to load (operation 435). If it is determined that a new path has not been established, then a new path is not set and the document navigation tool just waits for the next page to load (operation 435).

If the page has been visited before, then the document navigation tool determines if a path is already set on the page (operation 440). If a path has not been set on the page, the document navigation tool waits for a memorable event to be input by the user, and the operations to log the memorable event (operation 410) and determine if a path has been established (operation 425), as discussed previously, are then followed. If a path has been set on the page, then focus is set on the area where the path (or the place marker that begins the path) is set (operation 445). The document navigation tool then takes action(s) according to the path (operation 452). Such an action(s) may include filling in an editable field, selecting a link, or any other action or event. This action may be recorded as a memorable event in log of memorable events 420 (operation 455).

The feature of abandoning a path may also be included. For example, if a user aborts the function before it is able to take an action or complete a path, then the document navigation tool will log this event. The document navigation tool may abandon this path immediately or abandon it after the path has been aborted a certain number of times.

In another embodiment, the document navigation tool monitors how a user reads a page with a screen reader and removes portions of the page the user skips over repeatedly. For example, the document navigation tool could be used by a user who repeatedly visits a news site that displays links and graphics related to an article in combination with the article text. Without the document navigation tool, every time the user visits a news story on the website, he will repeat the same steps of moving the cursor to the top of the page, indicating to the screen reader to move to and read the article title, then indicate to the screen reader to skip past the links and the graphics, which precede the article text, and to read the article text. This feature also could be used, for example, to avoid advertisements. With the document navigation tool, the portions repeatedly skipped by the user would be removed from the screen reader's buffer. Therefore, the screen reader would read the article title and then the article text without needing any input from the user.

The use of a screen reader enables this function of the document navigation tool. Unlike with a sighted user, the exact portions of a web page being read by a blind user using a screen reader can be tracked. Tracking reading commands is very similar to tracking memorable events, as disclosed above. In this case, the document navigation tool will determine when a user is reading line-by-line or just 'skimming' down the page looking for something. Rates of reading include reading for memorization (fewer than 100 words per minute [wpm]); reading for learning (100-200 wpm); reading for comprehension (200-400 wpm); and skimming (400-700 wpm). Skimming is for superficially processing large amounts of text at a low level of comprehension (below 50%). By utilizing string handling techniques such as counting characters and whole words the amount of text on any given page or view can be calculated. Using this calculation over time as the end user pages, arrows, and/or scrolls down or between pages yields the relative words per minute. Furthermore, a screen reader maintains awareness of the portions of a page that a blind person is reading because screen reader commands must be issued to get each unit of text to be spoken or Brailed. Therefore, the document navigation tool may analyze the speed with which a user presses keys for navigation and speaking. If the keys are pressed rapidly it can be inferred that a user is moving down a page quickly to find interesting information. In contradistinction, if the key are pressed at a relatively slower rate, then it is likely that a user is actually interested in the text being spoken (i.e., listening for comprehension). It should also be noted that visual reading speed is typically higher (in wpm) than spoken word speed. Therefore, routine adjustments may be made for the type of output made to optimize the experience for the user. The aforementioned wpm values are illustrative only and the present invention anticipates flexibility is setting the wpm value that is indicative of skim reading versus reading for comprehension (either visually, by spoken word, by Braille or the like).

The document navigation tool can also alert the user that the page content has been modified and allow the user to retrieve the removed content at any time. This can be achieved by storing the "skipped" content in a database or other repository and comparing the previously stored content to what is currently available in a document (typically a web page). Another method is to simply count the number of characters in the skipped content to arrive at an integer value and then similarly counting the number of characters in the updated document "skipped" area to confirm whether anything has changed.

One method of suppressing repeatedly skipped content is to utilize common string handling techniques which are known by those of ordinary skill in the art. For example, if a web page document including several new sections including a "sports section" which is always displayed between a "health section" and a "science section" then an HTML string pattern for the start of the "sports section" would define the beginning of the to-be-redacted string and the HTML string pattern for the start of the "science section" would define the end of the "sports section." By using these two string patterns the "sports section" can be identified and redacted at runtime It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A computer program product for enabling a computer to automatically navigate a document, the product comprising a tangible, non-transitory computer readable storage medium bearing instructions for causing the computer to perform:
    opening the document on the computer;
    outputting the content of the document through a screen reader application to a user, the output selected from the group consisting of synthetic speech and refreshable Braille display;
    monitoring a frequency of user input keystrokes during navigation of the document including the user input keystrokes instructing the screen reader application to skip portions of the document and not output through the screen reader;
    determining portions of the document as skipped portions responsive to the frequency of the user input keystrokes exceeding a predefined value;
    saving a user navigation and an identity of the document to a log as a saved path; and
    responsive to subsequently reopening the document on the computer, applying the saved path to automatically suppress the skipped portions of the document to the user;
    wherein the instructions further perform the step of abandoning the saved path responsive to the saved path being aborted a predetermined number of times.

2. The computer program product of claim 1, wherein the instructions further perform the step of calculating the amount of text output by the screen reader application over time whereby portions of the document output by the screen reader over a predetermined words per minute value are presumed to be skipped by the user and automatically suppressed by the saved path.

3. The computer program product of claim 1, wherein the instructions further perform the step of abandoning the saved path responsive to new user navigation of the document.

4. The computer program product of claim 3, wherein the instructions further perform the step of automatically replacing the saved path with a new path based on the new user navigation of the document.

5. The computer program product of claim 1, wherein the instructions further perform the steps of archiving skipped portions to a database and outputting the archived skipped portions to the user responsive to detection of modified content in the reopened document.

* * * * *